US012113765B2

(12) United States Patent
Park (10) Patent No.: US 12,113,765 B2
(45) Date of Patent: Oct. 8, 2024

(54) SYSTEM AND METHOD FOR SOCIAL NETWORKING AMONG USERS OF A REUSABLE ITEM

(71) Applicant: Tokki, Inc., Spokane, WA (US)

(72) Inventor: Jane Park, Seattle, WA (US)

(73) Assignee: Tokki, Inc., Spokane, WA (US)

( * ) Notice: Subject to any disclaimer, the term of this patent is extended or adjusted under 35 U.S.C. 154(b) by 0 days.

(21) Appl. No.: 17/023,027

(22) Filed: Sep. 16, 2020

(65) Prior Publication Data

US 2021/0168111 A1 Jun. 3, 2021

Related U.S. Application Data (60) Provisional application No. 62/900,962, filed on Sep. 16, 2019.

(51) Int. Cl.
*G06Q 30/00* (2023.01)
*B65D 65/38* (2006.01)
(Continued)

(52) U.S. Cl.
CPC .............. *H04L 51/52* (2022.05); *B65D 65/38* (2013.01); *G06K 7/1417* (2013.01);
(Continued)

(58) Field of Classification Search
CPC ....... H04L 51/52; H04L 51/212; B65D 65/38; B65D 2203/06; B65D 2565/385;
(Continued)

(56) References Cited

U.S. PATENT DOCUMENTS

| 5,004,144 A * | 4/1991 | Selga | B65D 65/06 229/87.19 |
|---|---|---|---|
| 5,392,983 A * | 2/1995 | Clarke-Bolling | B65D 65/14 229/87.19 |

(Continued)

FOREIGN PATENT DOCUMENTS

| AU | 2010203012 A1 | 7/2010 | |
|---|---|---|---|
| KR | 101278444 B1 * | 7/2013 | ............. G06Q 30/02 |

OTHER PUBLICATIONS

Nicole Deck. Reducing, reusing and recycling after the holidays. (Dec. 27, 2014). Retrieved online Apr. 5, 2021. https://www.ocala.com/article/LK/20141227/Lifestyle/604149845/OS (Year: 2014).*

(Continued)

*Primary Examiner* — James A Reagan
(74) *Attorney, Agent, or Firm* — Lee & Hayes, P.C.

(57) ABSTRACT

A system and method are provided for social networking among users of reusable items, such as a reusable gift wrap assembly. The system can include an application that runs on a mobile device that enables users to create and share digital messages for the recipient of the gift. The gift wrap assembly can include a reusable wrap and a reusable band for binding the wrap about the gift. The gift wrap assembly includes a unique identifier that is recognizable by the system. In this manner, the system can track the gift wrap as it travels among users, thereby creating a social network connection between users that have interacted with the gift wrap assembly.

20 Claims, 13 Drawing Sheets

(51) Int. Cl.
*G06K 7/14* (2006.01)
*H04L 51/212* (2022.01)
*H04L 51/52* (2022.01)

(52) U.S. Cl.
CPC ........ *H04L 51/212* (2022.05); *B65D 2203/06* (2013.01); *B65D 2565/385* (2013.01)

(58) Field of Classification Search
CPC .............. G06K 7/1417; A45C 13/1046; A45C 2200/05; A45C 3/00; Y02W 30/80; Y02W 90/00; G06Q 10/087; G06Q 30/06; G06Q 50/01; G06Q 10/10; G06Q 30/00; G06Q 10/30; G06Q 50/30
See application file for complete search history.

(56) References Cited

U.S. PATENT DOCUMENTS

| | | | | |
|---|---|---|---|---|
| 5,718,100 | A * | 2/1998 | Petty | B65B 13/02 53/399 |
| 6,519,571 | B1 * | 2/2003 | Guheen | G06Q 30/0269 705/14.66 |
| 6,976,007 | B1 * | 12/2005 | Boucher | G06Q 10/0833 705/28 |
| 7,958,060 | B1 * | 6/2011 | Miner | G06Q 10/087 705/333 |
| 8,548,865 | B1 * | 10/2013 | Ho | G06Q 30/02 705/26.1 |
| 9,760,964 | B2 * | 9/2017 | Du | G06F 12/0875 |
| 10,171,476 | B2 * | 1/2019 | Khan | H04L 9/3234 |
| 10,210,590 | B2 * | 2/2019 | Du | G06F 9/451 |
| 10,237,774 | B2 * | 3/2019 | Klatt | H04W 24/10 |
| 10,618,714 | B2 * | 4/2020 | McNannay | A61J 1/065 |
| 11,021,306 | B2 * | 6/2021 | McNannay | B65D 75/367 |
| 2009/0024530 | A1 * | 1/2009 | Porter | G06Q 30/0601 705/50 |
| 2009/0194452 | A1 * | 8/2009 | Hession | A61J 7/04 206/532 |
| 2011/0155602 | A1 * | 6/2011 | Sterry | A61J 7/0436 206/459.1 |
| 2012/0209783 | A1 | 8/2012 | Smith, Jr. et al. | |
| 2014/0214505 | A1 | 7/2014 | Shuster-Arechiga et al. | |
| 2014/0249953 | A1 | 9/2014 | Sandridge | |
| 2014/0306978 | A1 * | 10/2014 | Du | G06F 9/451 345/581 |
| 2015/0088767 | A1 * | 3/2015 | Varadarajan | G06Q 10/30 705/308 |
| 2015/0242971 | A1 * | 8/2015 | Girard | G06Q 10/0635 705/7.28 |
| 2015/0246763 | A1 * | 9/2015 | Nowak | B65D 65/38 229/87.01 |
| 2016/0016383 | A1 * | 1/2016 | Muirhead | B32B 7/12 428/196 |
| 2017/0116569 | A1 * | 4/2017 | Cloud | G06Q 10/0833 |
| 2017/0173262 | A1 * | 6/2017 | Veltz | G16H 20/17 |
| 2017/0180229 | A1 | 6/2017 | Toksoz et al. | |
| 2017/0180299 | A1 * | 6/2017 | Garza | H04L 51/043 |
| 2017/0316539 | A1 * | 11/2017 | Du | G06F 3/0485 |
| 2017/0324750 | A1 * | 11/2017 | Khan | H04W 12/068 |
| 2018/0130163 | A1 * | 5/2018 | Kohn | G06Q 30/0242 |
| 2019/0370758 | A1 * | 12/2019 | Hauser | G06Q 10/30 |
| 2020/0024047 | A1 * | 1/2020 | McNannay | H05K 1/0269 |
| 2020/0175481 | A1 * | 6/2020 | Pham | G07F 19/21 |
| 2020/0342487 | A1 * | 10/2020 | Greenberger | B65D 25/205 |
| 2020/0361685 | A1 * | 11/2020 | McNannay | A61J 1/035 |
| 2021/0287185 | A1 * | 9/2021 | Yaguchi | G06K 19/06046 |

OTHER PUBLICATIONS

Ecogreenlover. DIY: Repurposed Gift Wrapping. (Nov. 27, 2014). Retrieved online Apr. 5, 2021. https://ecogreenlove.com/2014/11/27/diy-repurposed-gift-wrapping/ (Year: 2014).*

Canadian Office Action mailed Mar. 29, 2023 for Canadian patent application No. 3,151,4710, a foreign counterpart of U.S. Appl. No. 17/023,027, 5 pages.

Canadian Office Action mailed Jan. 29, 2024, for Canadian patent application No. 3,151,4710, a foreign counterpart of U.S. Appl. No. 17/023,027, 5 pages.

* cited by examiner

User interface: subsequent uses (public view)

tokki

This Tokki has been re-gifted 9 times so far.

Share it's eco-journey and keep it going!

08/27/2019
to: Brooks & Wells
from: Mommy & Daddy

08/23/2019
to: lucca
from: mommy

08/23/2019
to: taylor
from: Ioann

- User interface tracks number of reuses. User can also elect to receive email or text notifications.

- User can share information about the social network of gifting tracked by her unique QR code on social media.

- User interface shows basic information (to, from and emoji) for every reuse of the system.

FIG. 5

User Interface: Subsequent Uses (Private View)

| Gift message with "regift" and "history" options available | "history" button brings Up past gift message (collapsed view) | Expanded view via clicking "read message" brings up full gift message including text and media |

③ Overview of Gifting History
- city
- state

[○ Tap]
[✱ Swipe]

Activity History

⟨?⟩
- Scroll thru history of Gifting History
- user can tap to expand to see detail
- city
- state

[○ Tap]
[✱ Swipe]

Activity detailed

⟨?⟩ Latest Gifting History
- profile image
- city
- state
- message

[○ Tap]
[✱ Swipe]

Latest Activity

SYSTEM AND METHOD FOR SOCIAL NETWORKING AMONG USERS OF A REUSABLE ITEM

CROSS REFERENCE TO RELATED APPLICATION

This application claims the benefit of U.S. App. No. 62/900,962, filed Sep. 16, 2019, which is incorporated by reference.

FIELD OF THE INVENTION

The present invention relates generally to social networking sites, and more particularly, to social networking among users of a reusable item, such as, those who are in a contiguous chain of gifting.

BACKGROUND OF THE INVENTION

Single-use items can have an adverse impact on our environment, both in the manufacturing and disposal of such items. The environmental impact during manufacturing can include issues as CO2 emission, power usage, and resource efficiency, just to name a few. Moreover, disposal of single-use items can result is litter and strain on waste disposal resources, among others.

Such environmental concerns are important to many individuals. Typically, those intending to affect positive change for the environment typically do so through various channels such as political activism, charitable donations, volunteerism, or their profession. It is readily apparent that positive change results from individuals banding together around common concerns. However, it can be challenging for individuals to align their everyday purchasing decisions with such concerns, particularly when there is a lack of recyclable alternatives for typical single-use items.

For example, most gift wrap and gift cards are used as single-use items. Typically, gift wrap and gift cards are physical and not recyclable, contributing to significant land waste each year. Also, single-use items can raise practical concerns, e.g., recipients who want to save gift cards must store the physical items, which can get lost and destroyed.

As such, there remains a need for improved reusable gift wraps and gift cards. Moreover, connecting with other individuals aligned with concerns for the environment can further motivate individuals to increase their efforts towards environmental conservation.

It should, therefore, be appreciate that there remains a need for a system and method for social networking among users of reusable items.

SUMMARY OF THE INVENTION

Briefly, and in general terms, the present invention provides a computerized system and method for social networking among users of reusable items, such as a reusable gift wrap assembly. The system can include an application that runs on a mobile device that enables users to create and share digital messages for the recipient of the gift. The gift wrap assembly can include a reusable wrap or bag having means for securing the gift therein. The gift wrap assembly includes a unique identifier that is recognizable by the system, which can be incorporated onto the assembly. In this manner, the system can track the gift wrap as it travels among users, thereby creating a social network connection between users that have interacted with the gift wrap assembly associated with the unique identifier. As such, users will be motivated to reduce reliance on single-use items, such as disposable gift wraps and gift cards.

More specifically, in an exemplary embodiment, the present systems and methods is directed at facilitating richer communication between gift givers and gift recipients by enabling gift givers to record personalized digital messages that they can record and send to the gift recipients along with their physical gifts via a unique identifier, e.g., QR code or NFC. This system also tracks the reuse of the unique identifier, along a social chain of gifting.

In another detailed aspect of an exemplary embodiment, when the first gift recipient regifts the item, via the app, the user can create a new message for a second gift recipient. All givers/recipients along the chain can opt to receive a notification when a new message is recorded as associated with that gift wrap assembly as identified by the unique identifier, indicating that their item has been reused (contributing to less landfill waste). They can save all their interactions in a digital album of the system, and login to see information about gift givers and recipients further down the chain.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE
PREFERRED EMBODIMENTS

Figure 1:
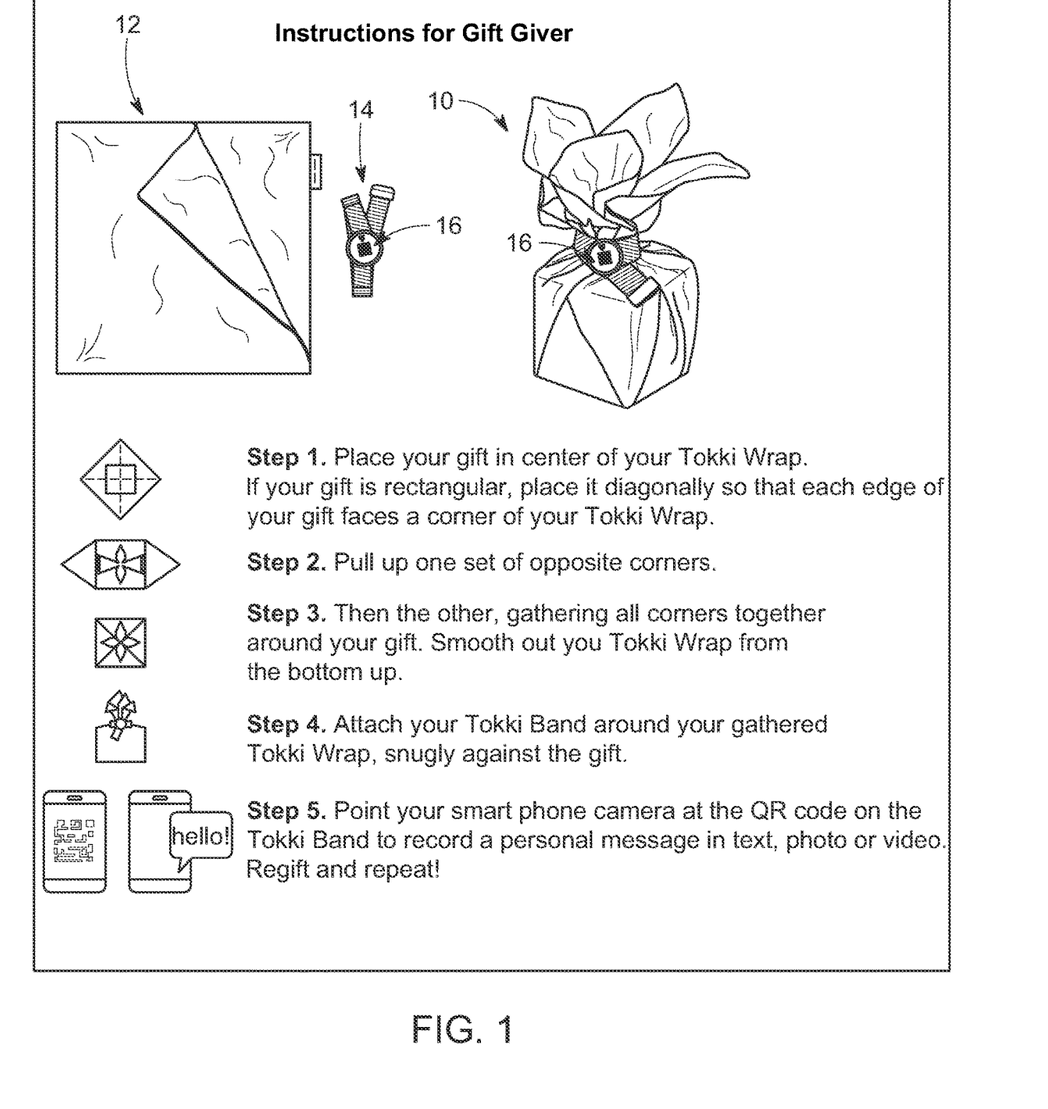
FIG. 1 depicts a reusable gift wrap assembly in accordance with the present invention, depicting a reusable wrap and securing band, along with wrapping instructions. The securing band includes a unique QR code that is recognizable by a mobile app of the system.
Figure 2:
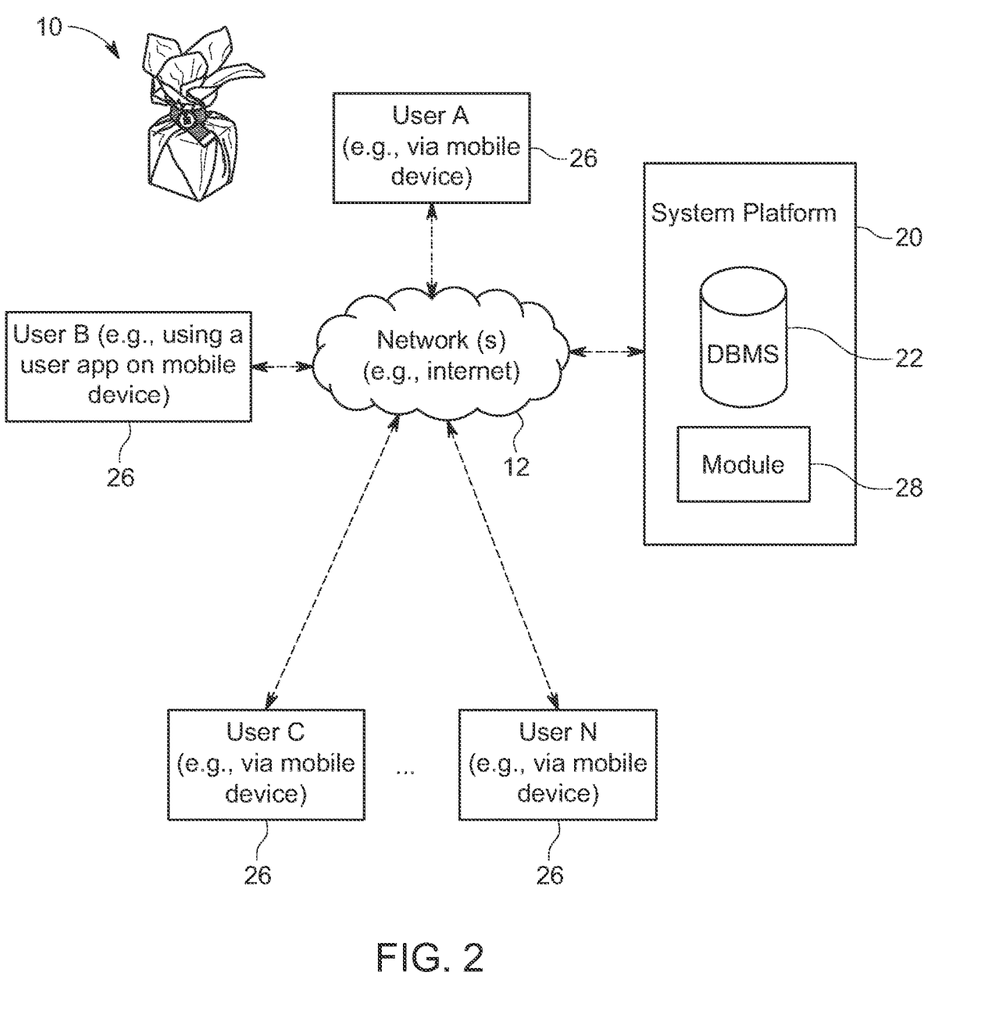
FIG. 2 is a simplified block diagram of a computerized system for social networking among users of a reusable item (reusable gift wrap assembly) accordance with the invention.

Referring now to the drawings, and particularly FIGS. 1 and 2, there is shown a gift wrap assembly 10 having a reusable gift wrap 12 and securing band 14 that interacts with a computerized system 20 that provides social networking among users of reusable items, such as a reusable gift wrap assembly 10. The system can include an application that runs on a mobile device that enables users to create and share digital messages for the recipient of the gift. The reusable band 14 is for binding the wrap 12 about the gift. The gift wrap assembly includes a unique identifier 16 that is recognizable by the system. In this manner, the system can track the gift wrap as it travels among users, thereby creating a social network connection between users that have interacted with that specific gift wrap assembly associated with the unique identifier. As such, users will be motivated to reduce reliance on single-use items, such as disposable gift wraps and gift cards.

In the exemplary embodiment, the unique identifier 16 of the gift wrap assembly 10 is in the form of a unique QR code (Quick Response Code). Each gift wrap assembly is assigned a unique QR code. In other embodiments, other unique identifiers can be used, e.g., alpha-numeric codes, bar codes, hash functions, Bluetooth® chips, micro RF antennas, near field communication (NFC), among others. In the exemplary embodiment, the unique identifier is disposed on the securing band 14. Additionally, or alternatively, the unique identifier can be disposed on, or otherwise attached to, the reusable wrap 12.

With continued reference to FIG. 1, step-by-step instructions are provided for wrapping a gift within the gift wrap assembly 10. Steps 1-4, detail a method for securing the wrap 12 about the gift, utilizing the band 14. Notably, the band should be positioned so that the unique identifier 16 (e.g., QR codes) is readily assessable. Step 5 reminds the user to utilize the system app (discussed in detail below) on mobile devices 26, such as a mobile phone, to create a digital message with the system app.

Figure 10:
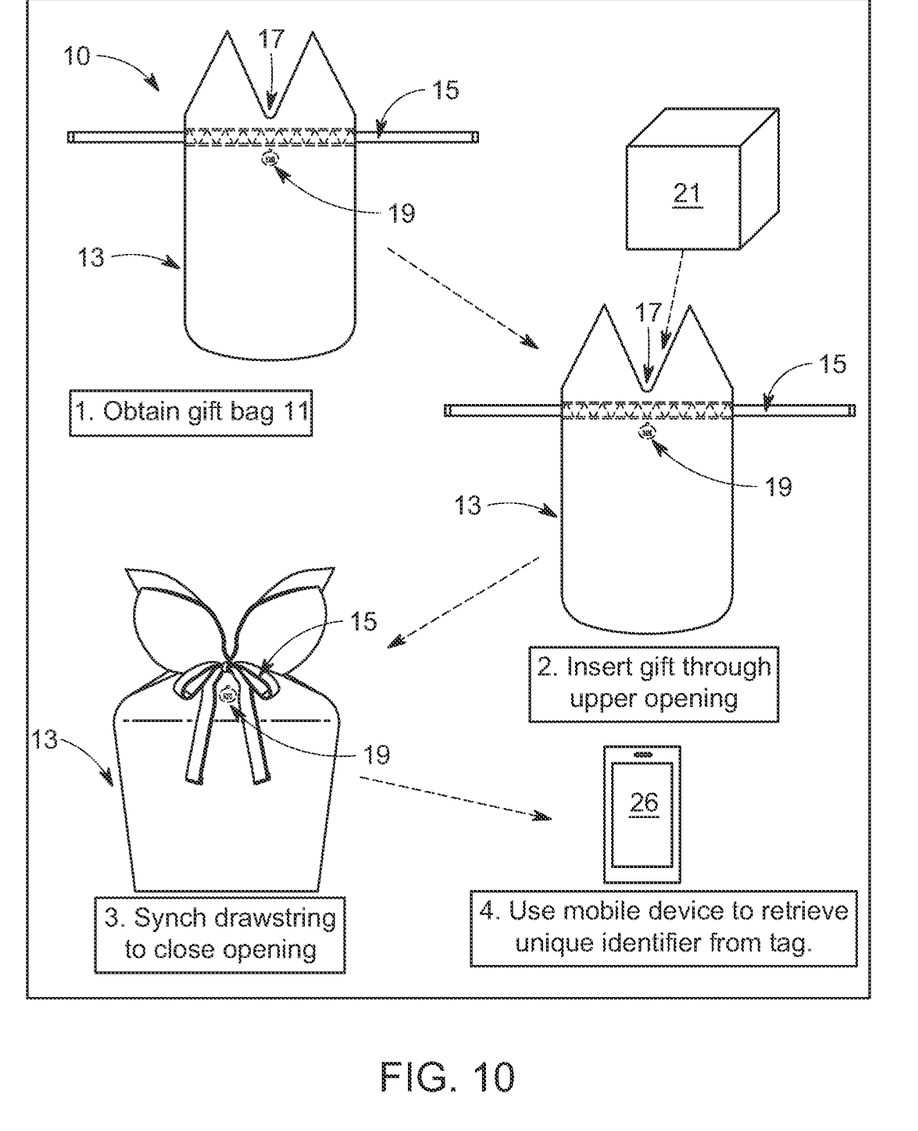
FIG. 10 depicts another embodiment of a reusable gift wrap assembly in accordance with the present invention, depicting a reusable bag having securing straps, along with a tag that provides a unique identifier that is recognizable by the system.

As shown in FIG. 10, in another embodiment, a gift wrap assembly 10 can comprise a bag 13 formed of reusable materiel, e.g., fabric, having a drawstring 15 about an upper opening 17 thereof to secure the contents, e.g., gift 21, within the bag. The unique identifier (e.g., a QR code and/or NFC) can be incorporated into a tag 19 attached proximate to the drawstring. In the exemplary embodiment, the tag incorporates both QR code and NFC, which identifies the gift wrap assembly as discussed in detail herein. The user can With reference now to FIG. 2, the system 20 includes a database management system (DBMS) 22 that maintains detailed data relating to user profiles, user location data, digital messages (including text, photos and videos), and gift wrap assemblies via corresponding unique identifiers. The system 20 further includes a system module 28 to execute system functionality, such as, gathers data from users 26 via a digital network 12, e.g., internet, to aid in populating the DBMS 22. For example, a user utilizes a device to interact with the system via a system app (program) running on the mobile device, which communicates via the digital networks with server(s), as is known in the art. In this manner, users provide user profile information, digital messages, gift wrap data (including unique identifier(s)), among other data, which is maintained in the DBMS for storage and access.

Figure 3:
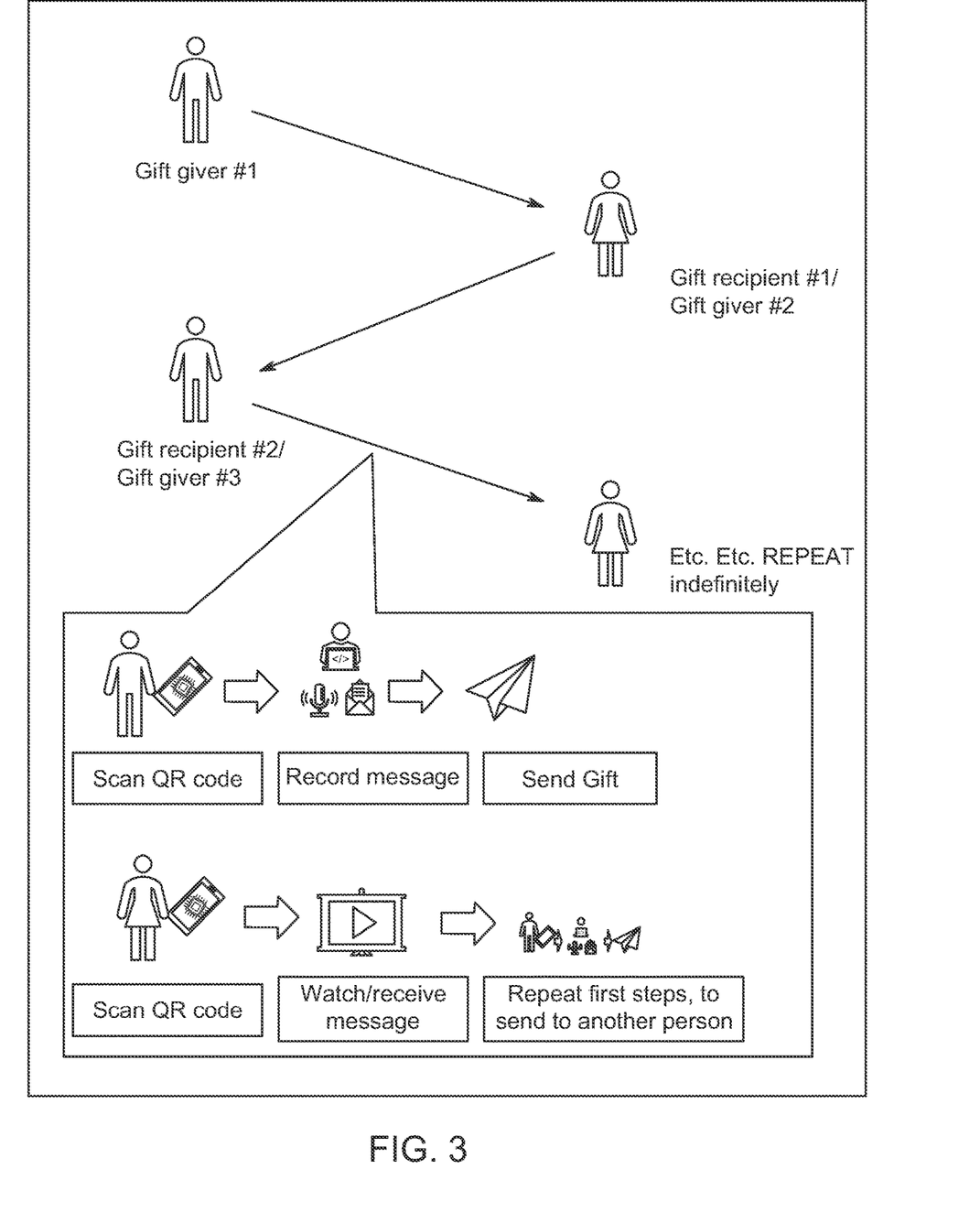
FIG. 3 is a simplified flow chart of a contiguous chain of gifting utilizing the gift wrap assembly of FIG. 1, wherein in each gift giver can record digital message for the gift receiver utilizing the system app running on a mobile device.

FIG. 3 depicts an exemplary contiguous chain of users as a reusable item is transfer among users. More particularly, the chain consists of users that have utilized a gift wrap assembly 10, as gift givers and gift recipients, using the system app. As a result, the user will be connected in a social network via the system. Each gift giver (message generator) uses the system app to record a digital message for the gift recipient, as detailed in FIG. 4.

Figure 4:
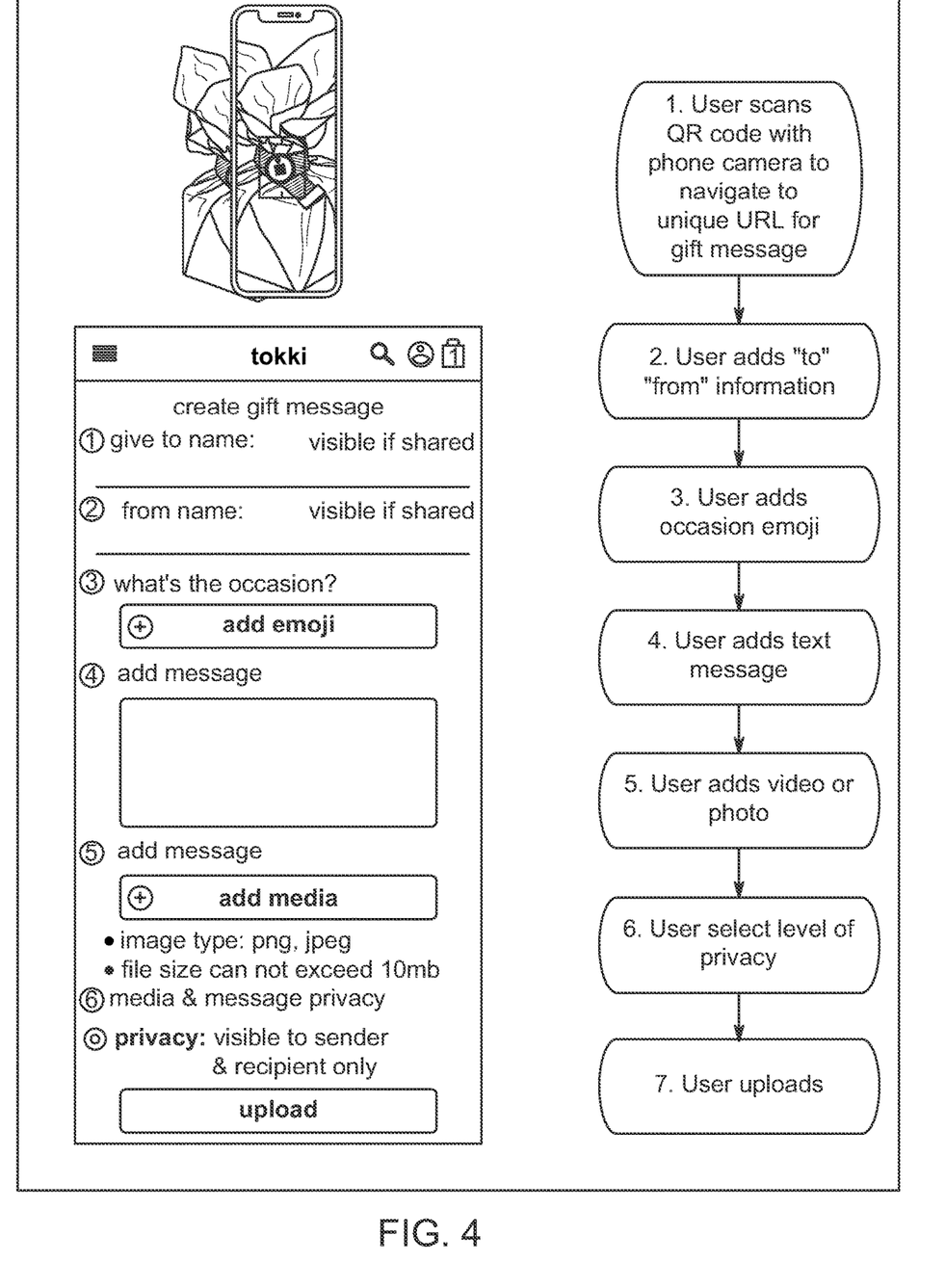
FIG. 4 depicts a screenshot of the system app for creating a gift message in accordance with the present invention, a flow chart is further provided that details steps for completing the message via the app such that the message is thereafter linked to the particular QR coded of the securing band of FIG. 1.

With reference to FIG. 4, a screenshot for creating a digital message via the system app is shown. First, the user scans the QR code with the mobile device. The user then provides "to" and "from" information and creates the message, using combinations of emojis, text, video, and/or photos. The system further enables the user to set the privacy level for the message. For example, the privacy option enables the user to select whether the digital message and uploaded media is viewable only by the gift giver and gift receiver, by all users along the contiguous chain of gifting, by all friends of the gift giver and gift receiver, etc. Additional privacy options may be available.

Figure 5:
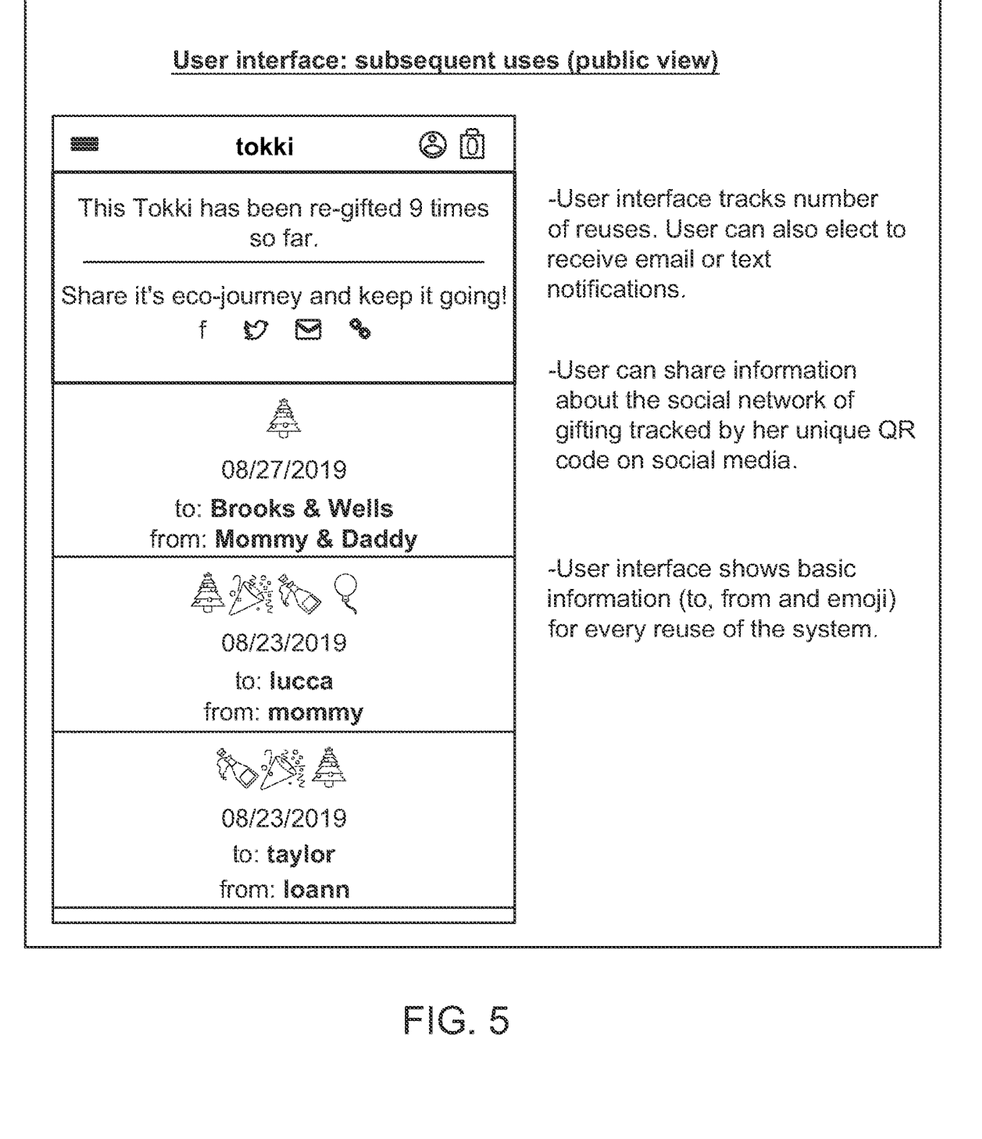
FIG. 5 depicts a screenshot of the system app for tracking a particular gift wrap along its chain of gifting, the screenshot provides information that has been designated for public view.

FIG. 5 provides a screenshot of the system app, depicting information that is publicly available relating to a specific gift wrap assembly 10 via its unique identifier. For example, users can track the number of reuses. The system can also provide details about the social network created as a result of the reuses. Moreover, basic information such as, "to," "from," and publicly available aspects of the digital messages can be viewed. Such social connections will promote further reuse, resulting in less reliance on single-use items, e.g., single-use gift wrapping and cards.

Figure 6:
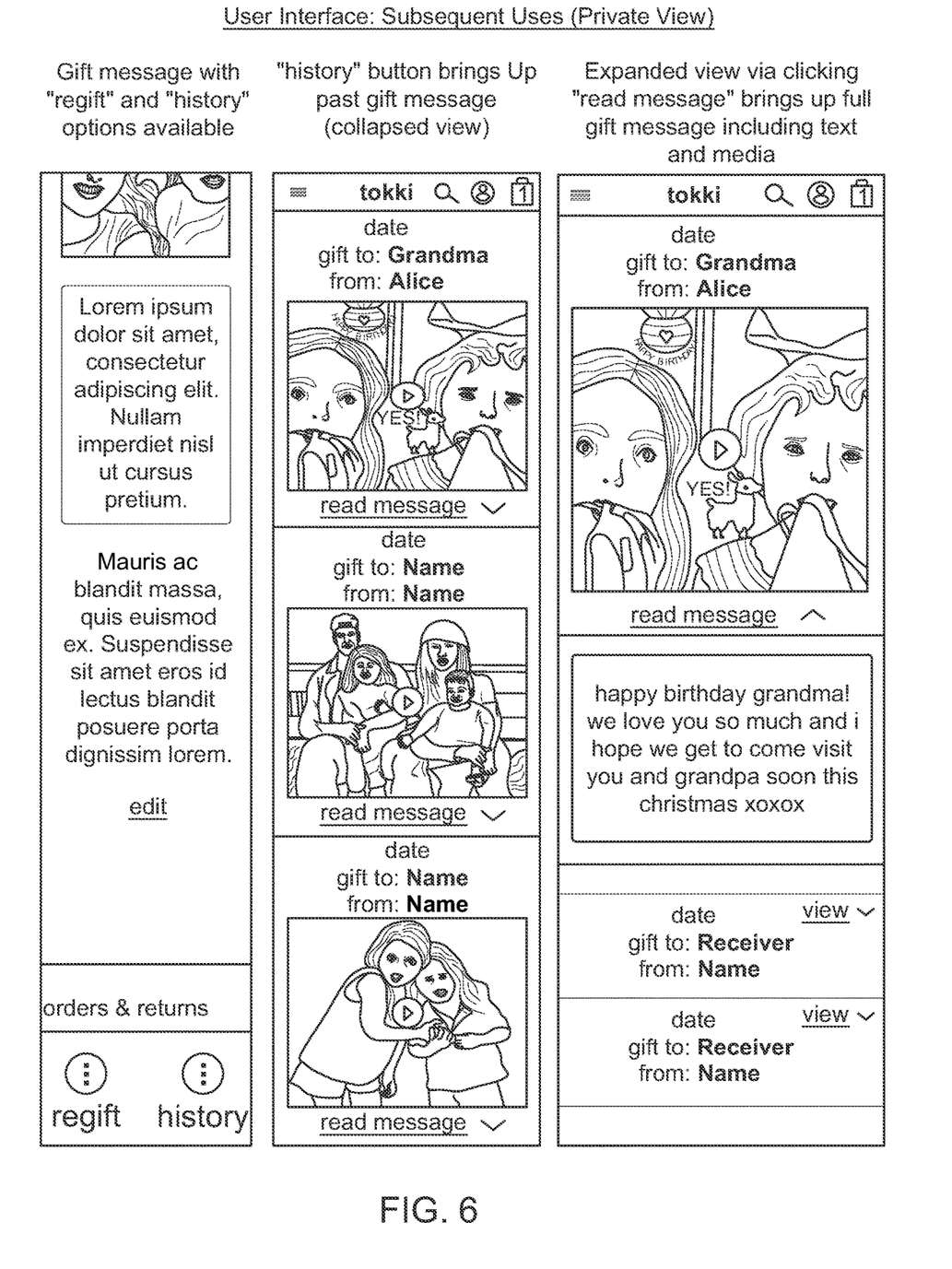
FIG. 6 depicts screenshots of the system app for tracking a particular gift wrap along its chain of gifting, the screenshot provides information that has been designated for private view.

FIG. 6 provides screenshots of the system app, depicting information that is confined to prescribed users via privacy settings. For example, authorized users can access specific digital messages to include text, video, photos, "to," and "from," etc. History button provides access to past digital messages.

Figure 7:
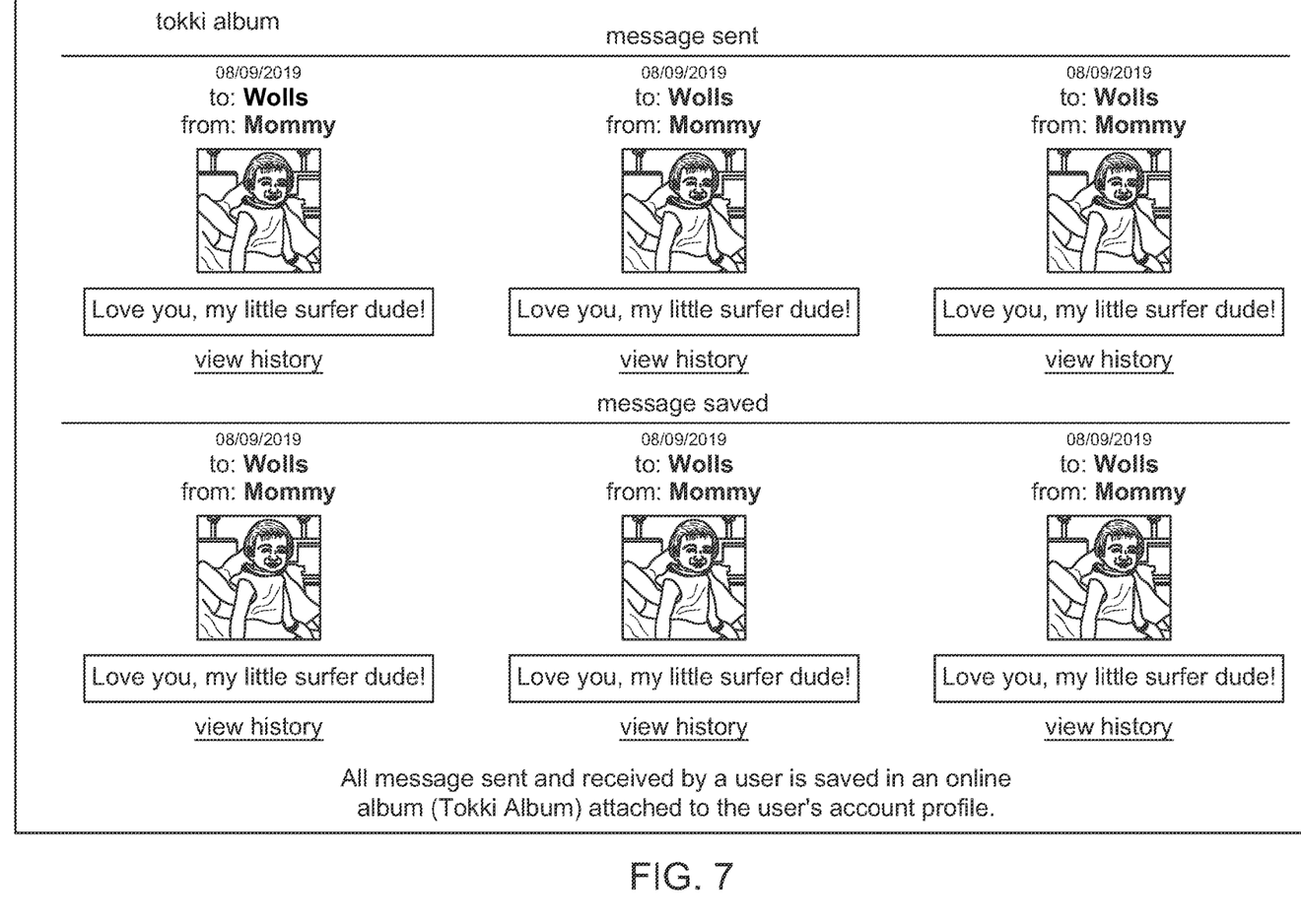
FIG. 7 depicts a screenshot of the system app for messages associated with a user of the system, the screenshot provides a user access to all digital messages sent and received with the system app.

FIG. 7 provides a screenshot of the system app, depicting an "Album" for a prescribed user showing all prior digital messages sent, received, and saved. The album is linked to the user profile.

Figure 8A:
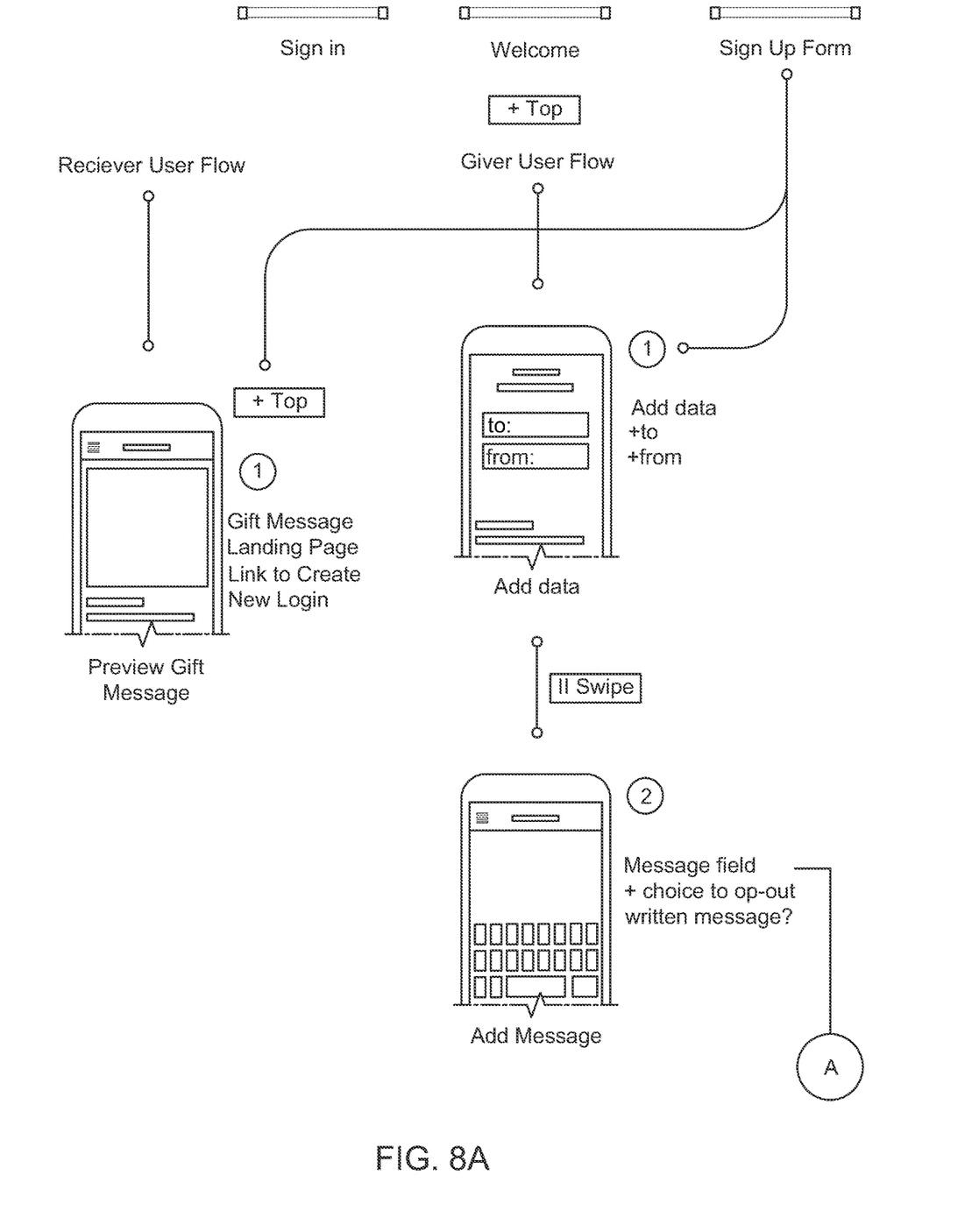
FIGS. 8A-8C provide a simplified flow chart depicting steps for users to interact with the system.
Figure 8B:
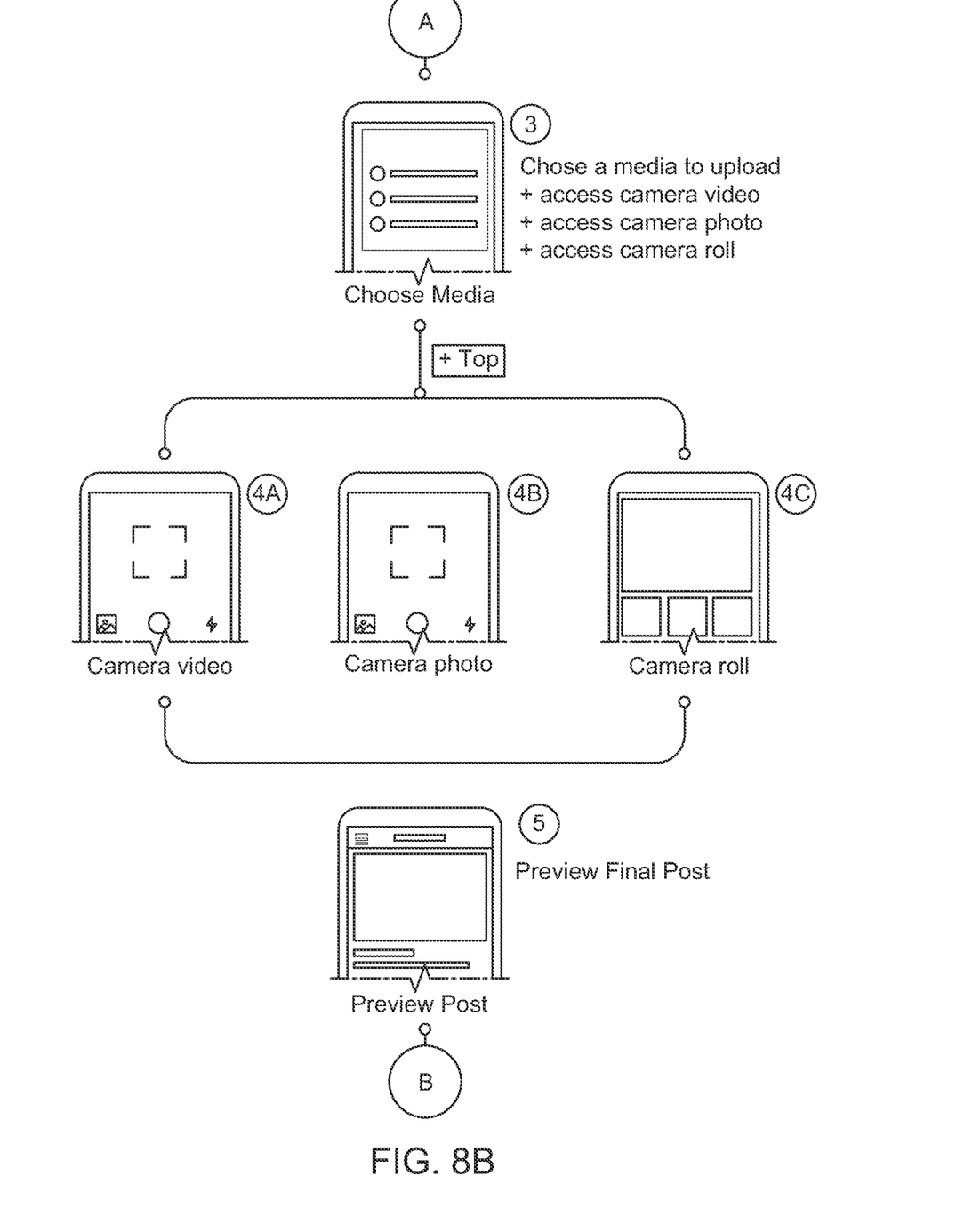
Figure 8C:
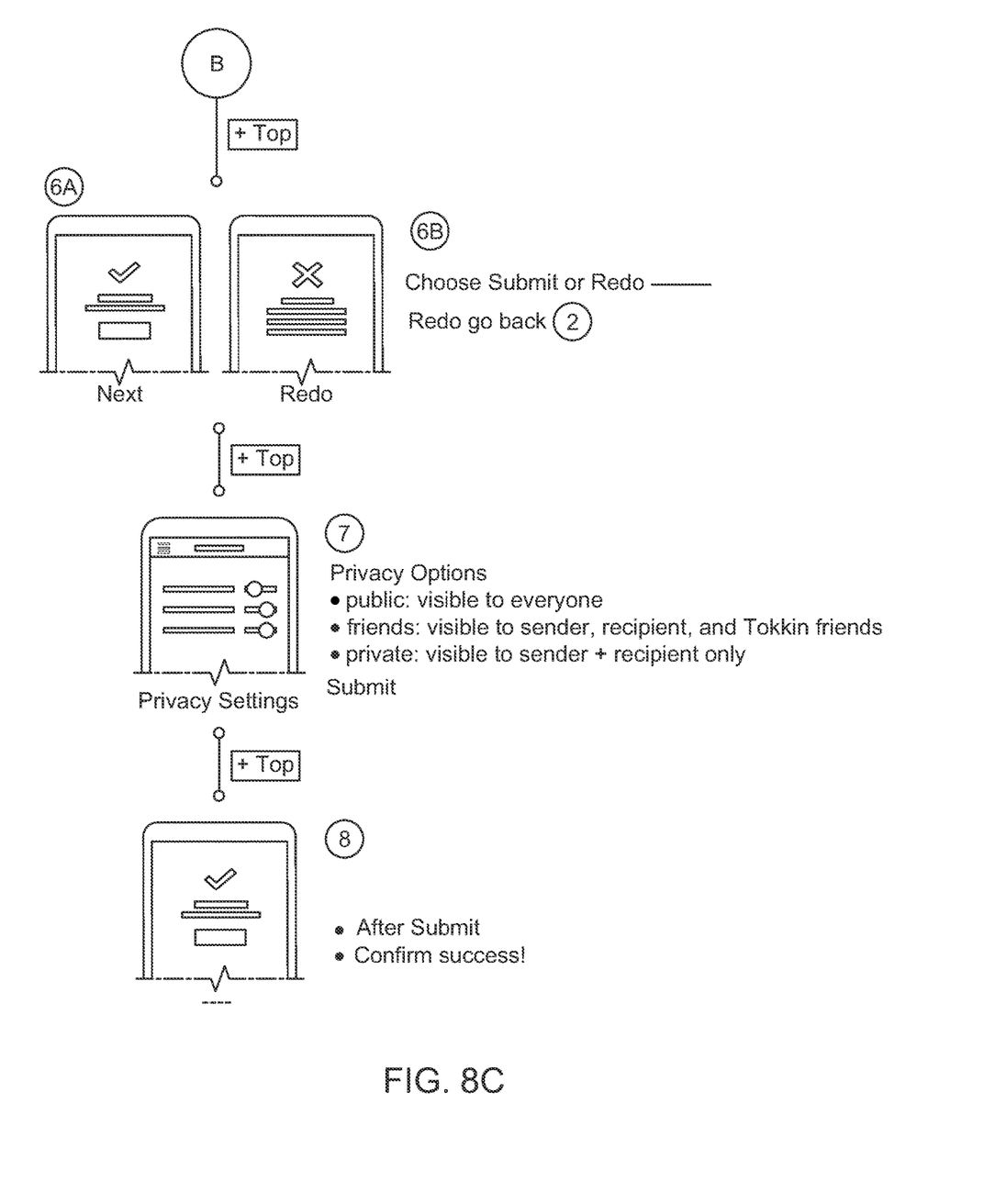

FIGS. 8A-8C provide a simplified flow chart depicting steps for users to interact with the system. The flow charts depict a giver user flow and a recipient user flow, along with corresponding screenshots for each step along the user flow. For example, FIG. 8B provides steps for creating digital media to incorporate in a digital message. FIG. 8C provides additional steps for completing the digital message, to include assigning a privacy setting for the message. In the exemplary embodiment, the user can choose from the following privacy settings:
(a) Public, message is visible to everyone, (b) Friends, message is visible to sender, recipient and friends, and (c) Private, message is visible to sender and recipient only.

Figure 9A:
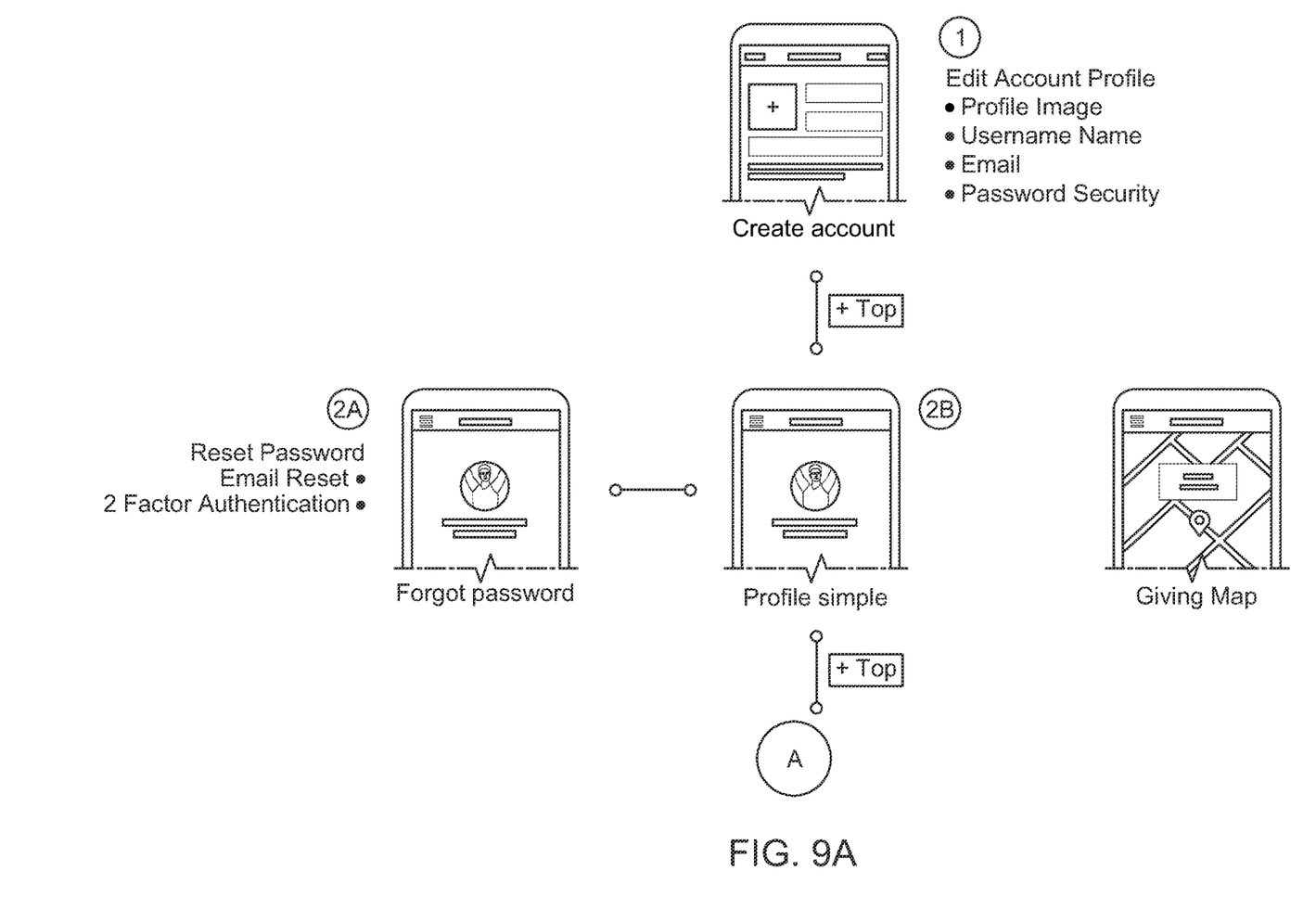
FIGS. 9A-9B provide a simplified flow chart depicting steps for users to interact with a user profile maintained by the system.
Figure 9B:
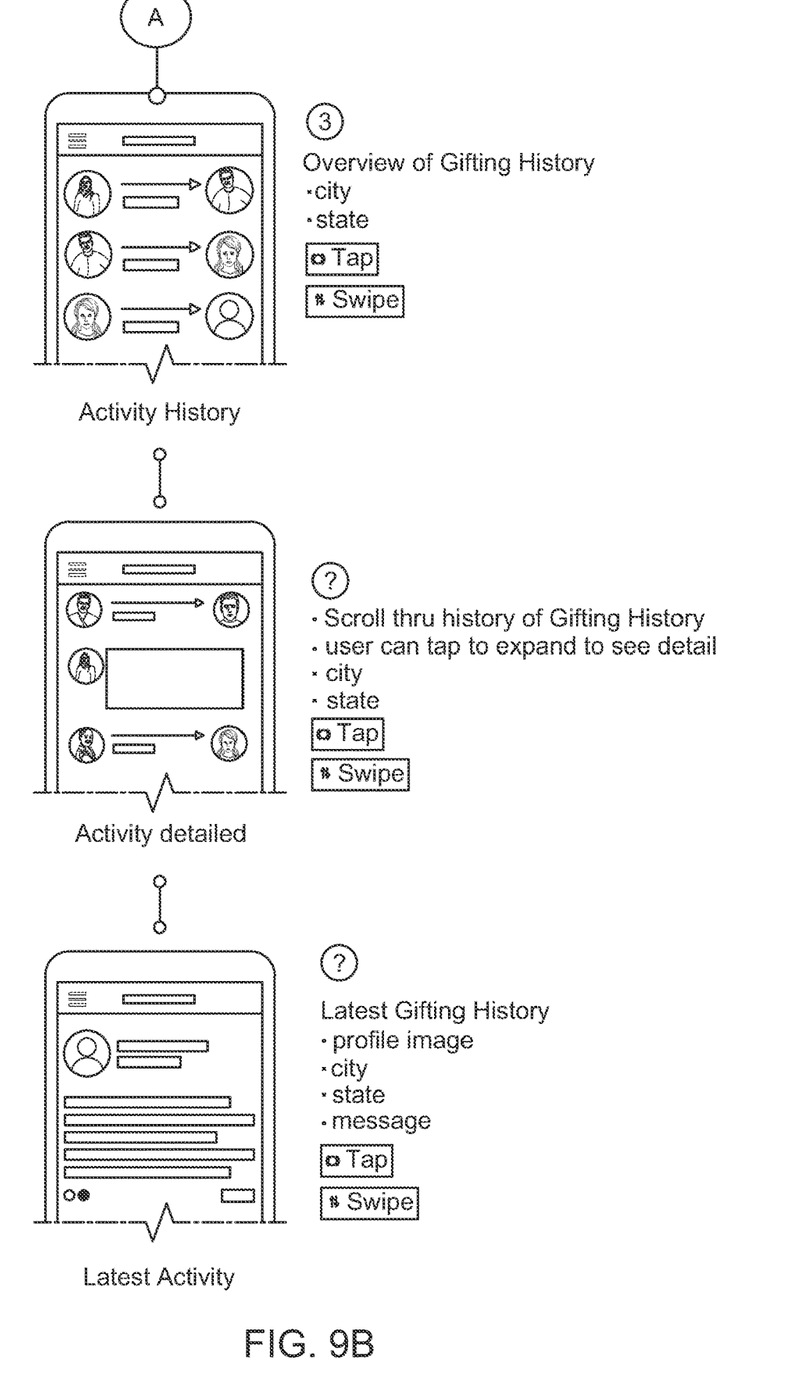

FIGS. 9A-9B provide a simplified flow chart depicting steps for users to interact with a user profile maintained by the system through the system app, thereby the user can create and manage an account with the system. The account can include an overview of the user's giving history, to include date, location, recipients, digital messages, and so on. In this way, users can track gifting history as well as link each individual gift wrap assembly the user has interacted with, thereby accessing the contiguous chain of gifting and corresponding users, as discussed above. In this manner, the user maintains connections with users throughout the world along the chain. This provides community ties to others that recognize the benefits of reusable items.

With reference again to FIG. 2, connections between components are shown using double-sided arrows, which may be physical, fiber optic, wireless, or any other type of communications link over a network. The network can be any of a variety of conventional network topologies and types (including optical, wired and/or wireless networks), using a variety of conventional network protocols (including public and/or proprietary protocols). The network can include, for example, home networks, cellular networks, corporate networks, Intranet(s), or the Internet, as well as possibly at least portions of one or more local area networks (LANs) and/or wide area networks (WANs) or telephone networks, among others.

The user devices 26 that may be any of a variety of digital devices, including, for example, and not limitation, a desktop PC, a notebook or portable computer, a workstation, an Internet appliance, a handheld PC, a cellular telephone or other wireless communications device, a personal digital assistant (PDA), a set-top box, or combinations thereof. Other hardware components capable of digitally communicating and interacting with the system can be used without departing from the invention.

The system 20 can incorporate a database management system (DBMS) 22 configured to store system information in digital format utilizing hardware known in the art, such as hard drive, random access memory, read only memory, flash memory, cache memory, a portable magnetic computer diskette, such as a floppy diskette, zip disk, and/or other configurations capable of storing programming, data, or other digital information on hardware devices, whether co-located or distributed across a network. Other hardware components capable of digitally communicating and interacting with the system can be used without departing from the invention.

The system 20 is arranged to include a system module 28 to process data, control data access and storage, issue commands, and control other desired operations. The system includes processing circuitry configured to implement desired programming. For example, processing circuitry (hardware) may be implemented as one or more processor and/or other structure configured to execute executable instructions including, for example, software and/or firmware instructions, and/or hardware circuitry. Exemplary embodiments of processing circuitry include hardware logic, state machines, and/or other structures alone or in combination with a processor. Storage circuitry is configured to store programming such as executable code or instructions (e.g., software and/or firmware), electronic data, databases, or other digital information and may include processor-usable media. Processor-usable media may be embodied in any computer program, product(s), or article of manufacture(s) that can contain, store, or maintain programming, data, and/or digital information for use by or in connection with an instruction execution system including processing circuitry in the exemplary embodiment. System capabilities (including processing, data processing, data storage, module features, and others) of the system can be co-located or distributed across a network (including internet) without departing from the invention.

It will be understood that when components, apparatus, appliance, functions, steps or elements of this invention need to be or may be implemented on a data processing apparatus as a whole, or any individual component thereof described herein, that the apparatus or any individual component as described herein may be utilized within the contemplation of this invention. For instance, if a flowchart as described herein expressly or implicitly requires for example that a processor or storage for example be utilized, the applicable components described herein may be so utilized even if not specifically recited for that step.

It should be appreciated from the foregoing that the present invention provides a computerized system and method for social networking among users of reusable items, such as a reusable gift wrap assembly. The system can include an application that runs on a mobile device that enables users to create and share digital messages for the recipient of the gift. The gift wrap assembly can include a reusable wrap and a reusable band for binding the wrap about the gift. The gift wrap assembly includes a unique identifier that is recognizable by the system. In this manner, the system can track the gift wrap as it travels among users, thereby creating a social network connection between users that have interacted with the gift wrap assembly. As such, users will be motivated to reduce reliance on single-use items, such as disposable gift wraps and gift cards.

The present invention has been described above in terms of presently preferred embodiments so that an understanding of the present invention can be conveyed. However, there are other embodiments not specifically described herein for which the present invention is applicable. Therefore, the present invention should not be seen as limited to the forms shown, which is to be considered illustrative rather than restrictive.

Although the invention has been disclosed in detail with reference only to the exemplary embodiments, those skilled in the art will appreciate that various other embodiments can be provided without departing from the scope of the invention, to include any and all combination of features discussed herein.

What is claimed is:

1. A system comprising:
   a database;
   one or more processors; and
   one or more non-transitory computer-readable media storing computer-executable instructions that, when executed by the one or more processors, cause the one or more processors to perform operations comprising:
   receiving, from a first device, first data associated with a digital identifier of a gift bag;
   receiving, from the first device, second data representing a digital message to associate with the digital identifier of the gift bag, the digital message identifying a first user of the first device that generated the digital message and a second user that is an intended recipient of the digital message;

storing, in the database, the digital message in association with the digital identifier;

receiving, from a second device, third data associated with the digital identifier, the third data representing a request to access the digital message;

receiving, from the second device, fourth data associated with an identifier of the second device;

determining that the identifier of the second device is associated with the intended recipient; and based at least in part on the identifier being associated with the intended recipient, sending, to the second device, fifth data associated with the digital message, wherein the second device is configured to display the digital message.

2. The system of claim 1, wherein the digital identifier is at least one of configured to attach to the gift bag or included on the gift bag.

3. The system of claim 1, the operations further comprising receiving, from the first device, privacy settings associated with accessing the digital message, and wherein sending the digital message is based at least in part on the privacy settings.

4. The system of claim 1, the operations further comprising:

determining a second digital message stored in the database that is associated with the digital identifier, the second digital message identifying a third user that generated the second digital message and a fourth user that is an intended recipient of the second digital message; and sending, to the second device and based least in part on receiving the third data, sixth data associated with the second digital message.

5. The system of claim 1, the operations further comprising:

receiving, from the second device, sixth data associated with the digital identifier of the gift bag;

receiving, from the second device, seventh data associated with a second digital message associated with the digital identifier of the gift bag, the second digital message identifying the second user of the second device that generated the second digital message and a third user that is an intended recipient of the second digital message; and storing, in the database, the second digital message in association with the digital identifier.

6. A method comprising:

receiving, from a first device, first data associated with a machine-readable identifier of a gift wrap, wherein the machine-readable identifier is at least one of integrated within with the gift wrap, included within the gift wrap, or configured to couple to the gift wrap;

causing, on the first device and based at least in part on receiving the first data, display of a first interface for providing a digital message to associate with the gift wrap;

receiving, from the first device, second data associated with the digital message, the digital message identifying a first user that generated the digital message and a second user that is an intended recipient of the digital message;

determining one or more settings associated with a privacy of the digital message;

storing, in a database of digital messages, the digital message in association with the machine-readable identifier and the one or more settings;

receiving, from a second device, third data associated with the machine-readable identifier of the gift wrap;

determining, based at least in part on the third data, the digital message stored in association with the machine-readable identifier; and causing, based at least in part on the one or more settings, display of a second interface on the second device associated with the digital message.

7. The method of claim 6, wherein the third data is associated with a request to access the digital message.

8. The method of claim 6, wherein storing the digital message in association with the machine-readable identifier comprises at least one of:

storing a first indication of the first user;

storing a second indication of the second user;

storing one or more photos;

storing one or more videos; or storing one or more audio files.

9. The method of claim 6, further comprising:

receiving, from the first device, fourth data associated with the one or more settings that control access to a history of the digital message; and determining, based at least in part on the third data and the one or more settings, that at least one of the second device or the second user associated with the second device is permitted to access the history of the digital message.

10. The method of claim 6, further comprising:

determining a second digital message stored in the database that is associated with the machine-readable identifier; and sending, to the second device, fourth data associated with the second digital message.

11. The method of claim 6, further comprising:

receiving, from a third device, fourth data associated with the machine-readable identifier of the digital message; and sending, to the third device, fifth data associated with the digital message.

12. The method of claim 6, further comprising:

receiving, from the first device, fourth data associated with a request to access a history of digital messages associated with the machine-readable identifier; and causing, on the first device and based at least in part on receiving the fourth data, display of the history of digital messages associated with the machine-readable identifier.

13. A method comprising:

storing, in a database, an indication of a first identifier associated with a gift wrap or a gift bag, and the first identifier representing a machine- readable code coupled to or disposed on the gift wrap or the gift bag;

receiving, from a first device, first data associated with a digital message to associate with the gift wrap or the gift bag, the first data including:

the first identifier associated with the gift wrap or the gift bag, a second identifier associated with a sender of the digital message, and a third identifier associated with a recipient of the digital message;

storing, in the database, the digital message in association with the first identifier;

receiving, from a second device, second data associated with a request to access the digital message, the second data including a fourth identifier associated with the recipient;

determining, based at least in part on the third identifier and the fourth identifier being a same, that the request to access the digital message is authorized;

causing, based at least in part on the request being authorized, the digital message to be displayed on the second device; and sending, to the first device and based at least in part on causing display of the digital message on the second device, third data associated with the digital message being provided to the second device or the digital message being accessed by the recipient.

14. The method of claim 13, further comprising at least one of:

storing a first indication of the digital message in association with a first user profile of the sender; or storing a second indication of the digital message in association with a second user profile of the recipient.

15. The method of claim 13, further comprising at least one of:

receiving, from the first device, fourth data associated with one or more settings that control access to the digital message; or determining the one or more settings associated with the digital message, wherein the one or more settings are stored in association with the digital message.

16. The method of claim 13, further comprising:

determining a second digital message stored in the database that is associated with the first identifier; and causing, based at least in part on receiving the request, the second digital message to be provided to the second device.

17. The method of claim 13, further comprising:

receiving, from a third device, fourth data associated with the first identifier of the gift wrap or the gift bag; and sending, to the third device, fifth data associated with one or more digital messages, the one or more digital messages including the digital message.

18. The method of claim 13, further comprising:

receiving, from the second device, an indication to share the digital message with a user profile associated with the recipient; and causing the digital message to be associated with the user profile of the recipient.

19. The method of claim 13, further comprising:

causing the first device to display a first interface associated with providing:
the second identifier,
the third identifier, and
text associated with the digital message, wherein causing the digital message to be display on the second device comprises causing the second device to display a second interface that includes the second identifier, the third identifier, and the text associated with the digital message.

20. The method of claim 13, wherein the third identifier and the fourth identifier are associated with the second device.

* * * * *